US010309872B2

(12) United States Patent
Hyodo

(10) Patent No.: US 10,309,872 B2
(45) Date of Patent: Jun. 4, 2019

(54) MISFIRE DETERMINATION APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Junji Hyodo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 109 days.

(21) Appl. No.: 15/138,721

(22) Filed: Apr. 26, 2016

(65) Prior Publication Data
US 2016/0334305 A1 Nov. 17, 2016

(30) Foreign Application Priority Data

May 14, 2015 (JP) .................................. 2015-098954

(51) Int. Cl.
| | |
|---|---|
| *G01M 15/11* | (2006.01) |
| *F02D 41/24* | (2006.01) |
| *F02D 41/00* | (2006.01) |
| *F02D 41/22* | (2006.01) |
| *F02D 41/14* | (2006.01) |

(52) U.S. Cl.
CPC .......... *G01M 15/11* (2013.01); *F02D 41/009* (2013.01); *F02D 41/1498* (2013.01); *F02D 41/22* (2013.01); *F02D 41/2403* (2013.01); *Y02T 10/40* (2013.01)

(58) Field of Classification Search
CPC ................ G01M 15/046; G01M 15/11; F02D 2200/1015; F02D 2200/10; F02D 2200/101; F02D 2200/1012; B60W 2710/0644

USPC .......................................... 73/114.04, 114.02
See application file for complete search history.

(56) References Cited

U.S. PATENT DOCUMENTS

| | | | | |
|---|---|---|---|---|
| 4,944,358 A | * | 7/1990 | Wazaki .................. | B60K 28/16 123/325 |
| 5,275,037 A | | 1/1994 | Nakayama et al. | |

(Continued)

FOREIGN PATENT DOCUMENTS

| | | |
|---|---|---|
| DE | 10257383 B4 | 10/2014 |
| JP | H04-365958 A | 12/1992 |

(Continued)

*Primary Examiner* — Daniel S Larkin
*Assistant Examiner* — Anthony W Megna Fuentes
(74) *Attorney, Agent, or Firm* — Oliff PLC

(57) ABSTRACT

A misfire determination apparatus includes a rotation variation amount acquisition unit that obtains a rotation variation amount ($\Delta NE$), which is a difference between a first angular velocity variation amount ($\Delta\omega 1$) obtained during an expansion stroke of an arbitrary cylinder of a multi-cylinder internal combustion engine and a second angular velocity variation amount ($\Delta\omega 2$) having been obtained in relation to a cylinder that has reached the expansion stroke N (where N is a positive integer) revolutions of a crankshaft before the arbitrary cylinder reaches the expansion stroke, and a misfire determination unit that, when the obtained rotation variation amount ($\Delta NE$) exceeds a predetermined threshold ($\Delta NEth$), determines that a misfire has not occurred in the internal combustion engine when a predetermined condition is established, and determines that a misfire has occurred in the internal combustion engine when the predetermined condition is not established.

3 Claims, 8 Drawing Sheets

(56) References Cited

U.S. PATENT DOCUMENTS

| | | | |
|---|---|---|---|
| 5,909,724 A * | 6/1999 | Nishimura | F02D 41/1498 123/436 |
| 2002/0016666 A1 | 2/2002 | Maegawa | |
| 2003/0197511 A1 | 10/2003 | Takahashi et al. | |
| 2010/0031736 A1 * | 2/2010 | Kushihama | G01M 15/11 73/114.04 |

FOREIGN PATENT DOCUMENTS

| | | |
|---|---|---|
| JP | H05-340294 A | 12/1993 |
| JP | H07-145752 A | 6/1995 |
| JP | 2002-047996 A | 2/2002 |
| JP | 2009-138663 A | 6/2009 |
| JP | 2009-293501 A | 12/2009 |
| JP | 2011-252428 A | 12/2011 |
| JP | 2014-199040 A | 10/2014 |

* cited by examiner

ANGULAR VELOCITY VARIATION AMOUNT: $\Delta\omega = \omega_{k-1} - \omega_k$

ROTATION VARIATION AMOUNT: $\Delta NE = \Delta\omega_1 - \Delta\omega_2$
$= (\omega_{n-1} - \omega_n) - (\omega_{n-7} - \omega_{n-6})$

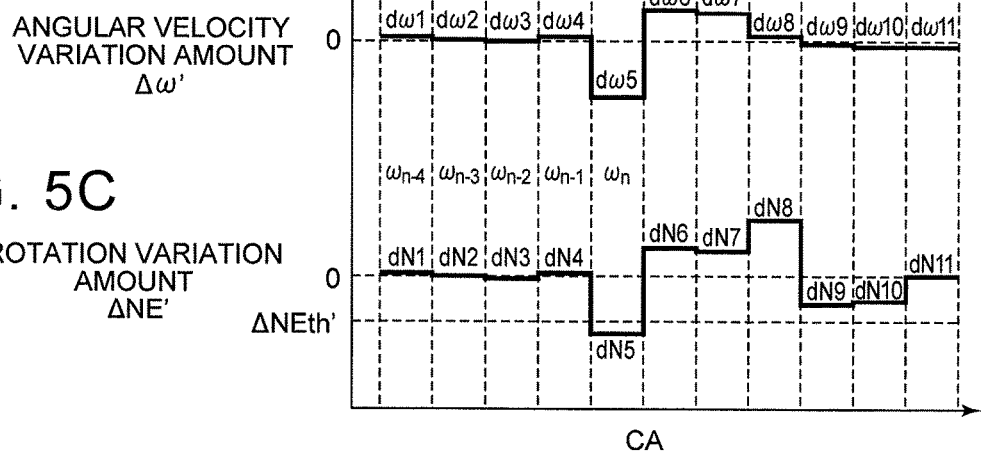
FIG. 5A CA VELOCITY
FIG. 5B ANGULAR VELOCITY VARIATION AMOUNT Δω'
FIG. 5C ROTATION VARIATION AMOUNT ΔNE'
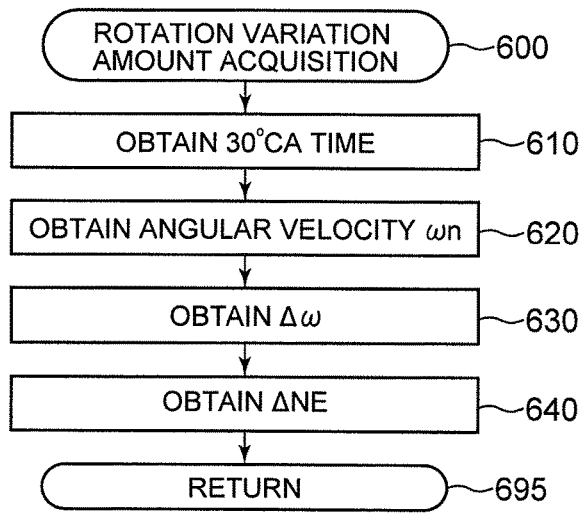
FIG. 6

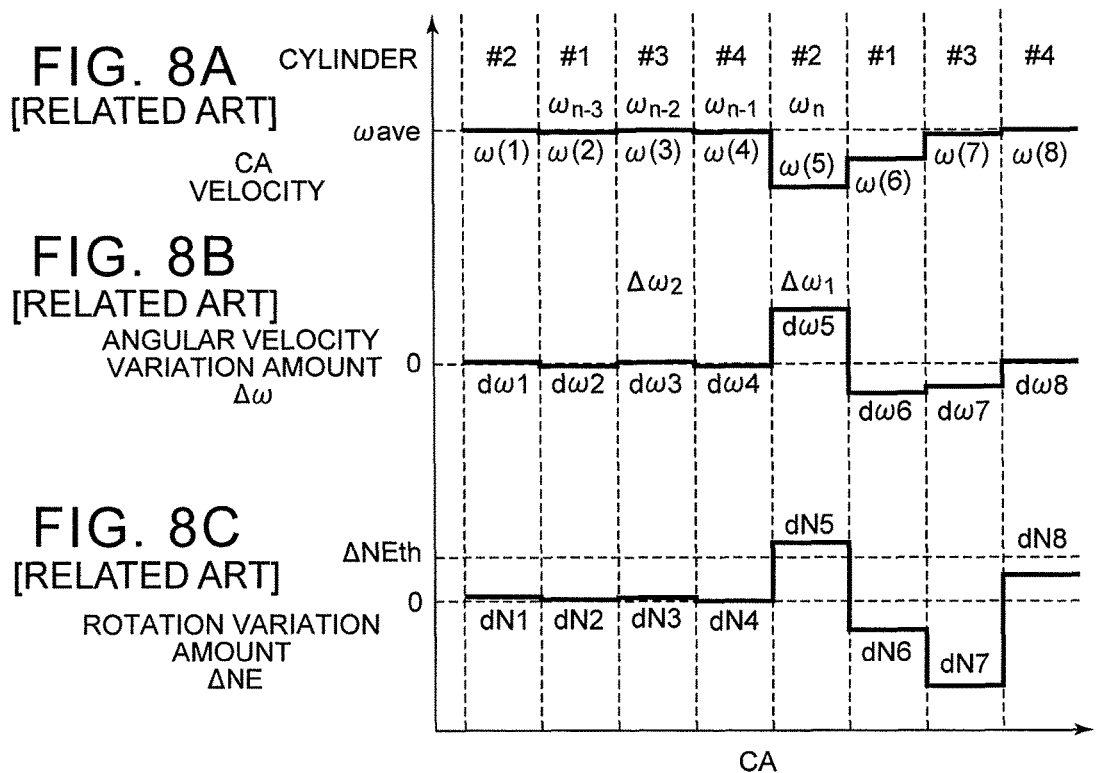
ANGULAR VELOCITY VARIATION AMOUNT: $\Delta\omega = \omega_{k-1} - \omega_k$
ROTATION VARIATION AMOUNT: $\Delta NE = \Delta\omega_1 - \Delta\omega_2$
$= (\omega_{n-1} - \omega_n) - (\omega_{n-3} - \omega_{n-2})$

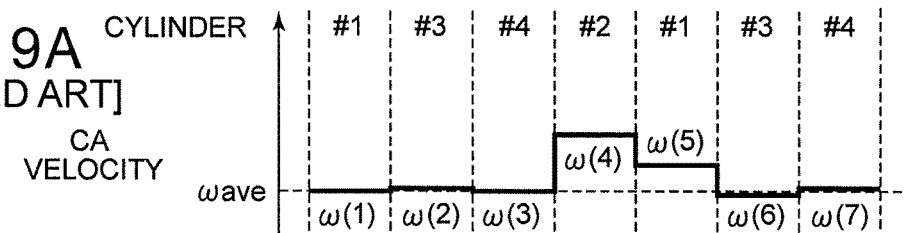
FIG. 9A [RELATED ART]
FIG. 9B [RELATED ART]
FIG. 9C [RELATED ART]
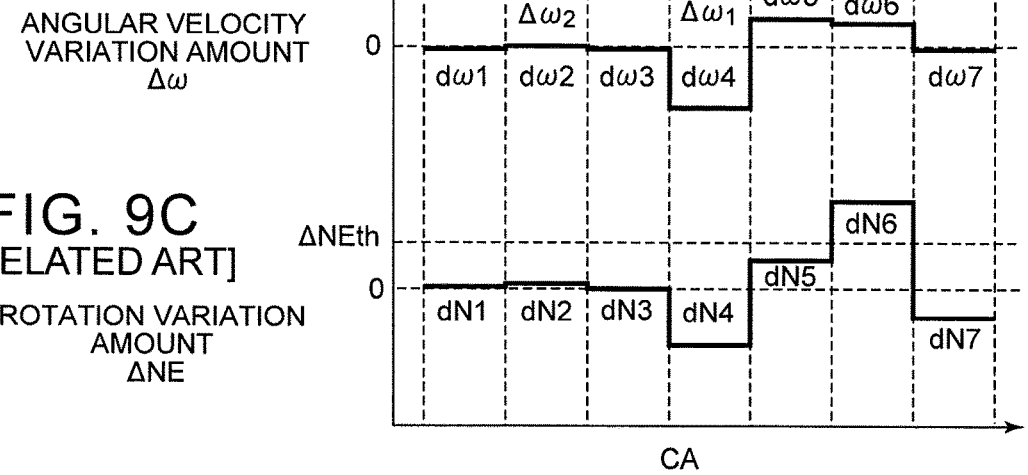
ANGULAR VELOCITY VARIATION AMOUNT: $\Delta\omega = \omega_{k-1} - \omega_k$
ROTATION VARIATION AMOUNT: $\Delta NE = \Delta\omega_1 - \Delta\omega_2$
$= (\omega_{n-1} - \omega_n) - (\omega_{n-3} - \omega_{n-2})$

MISFIRE DETERMINATION APPARATUS FOR INTERNAL COMBUSTION ENGINE

INCORPORATION BY REFERENCE

The disclosure of Japanese Patent Application No. 2015-098954, filed on May 14, 2015 including the specification, drawings and abstract, is incorporated herein by reference in its entirety.

BACKGROUND OF THE INVENTION

1. Field of the Invention

The invention relates to a misfire determination apparatus for an internal combustion engine, which determines whether or not a misfire has occurred on the basis of an amount of variation in a crank angle velocity, or in other words a rotation velocity of the internal combustion engine.

2. Description of Related Art

Misfire determination apparatuses that focus on variation in a rotation velocity (a crank angle velocity) of an internal combustion engine during a misfire so as to determine whether or not a misfire has occurred on the basis of variation in the rotation velocity have been proposed. In many of these misfire determination apparatuses, the rotation velocity of the internal combustion engine is detected using a timing rotor that is provided on a crankshaft so as to rotate together with the crankshaft. More specifically, the rotation velocity of the internal combustion engine is obtained on the basis of a signal detected by a sensor (a pickup) fixed to the internal combustion engine when outer teeth carved on the timing rotor at equal intervals pass over the sensor, which is disposed opposite the outer teeth, as the crankshaft rotates.

However, the outer teeth of the timing rotor include mechanical dimension errors such as a manufacturing error. Therefore, even when the crank angle velocity is constant, variation (also referred to hereafter as "rotation variation") in the crank angle velocity may be detected over a crank angle period of 360°, and this periodic rotation variation may lead to erroneous determination of a misfire. A misfire determination apparatus (referred to hereafter as "the conventional apparatus") that is capable of canceling out this periodic rotation variation has been proposed (Japanese Patent Application Publication No. 4-365958 (JP 4-365958 A), for example). Note that in this specification, the crank angle will be also expressed by "CA". In other words, a crank angle of 360°, for example, will be expressed as 360° CA.

As will be described in detail below, an amount of variation in the CA velocity is calculated as a difference between a CA velocity calculated from an amount of time (also referred to hereafter as a "required rotation time") required for the crankshaft to rotate through a range extending from compression top dead center TDC (0° CA) to 30° CA of an arbitrary cylinder and a CA velocity calculated from the required rotation time of a cylinder that reaches an expansion stroke immediately before the arbitrary cylinder. The amount of variation in the CA velocity will be referred to hereafter as an "angular velocity variation amount".

In the conventional apparatus, to ensure that a misfire is not detected erroneously due to the "rotation variation" that may occur over a period of 360° CA, as described above, the angular velocity variation amount (also referred to hereafter as a "first angular velocity variation amount") of the arbitrary cylinder and the angular velocity variation amount (also referred to hereafter as a "second angular velocity variation amount") of a cylinder that reaches the expansion stroke 360° CA before the arbitrary cylinder are calculated, whereupon a difference between the first angular velocity variation and the second angular velocity variation is determined as a "rotation variation amount". The conventional apparatus determines that a misfire has occurred when the rotation variation amount exceeds a misfire determination threshold.

A misfire determination method employed by the conventional apparatus and variation in the rotation variation amount when a misfire occurs will be described more specifically below with reference to FIGS. 8A to 8C. In this example, the internal combustion engine is a four-cylinder internal combustion engine, and a firing order is set as first cylinder #1, third cylinder #3, fourth cylinder #4, second cylinder #2 (#1→#3→#4→#2). FIGS. 8A to 8C show variation in the CA velocity, the angular velocity variation amount, and the rotation variation amount, respectively, relative to the CA. Note that the CA velocity will also be referred to hereafter simply as the "angular velocity".

A first angular velocity variation amount $\omega 1$ ($d\omega 5$) is defined by a following equation as a difference between an angular velocity $\omega n$ ($\omega(5)$) calculated from an amount of time (the required rotation time) required for the crankshaft to rotate through a range extending from compression top dead center TDC to 30° CA of a misfire determination subject cylinder (the second cylinder #2, for example, in FIGS. 8A to 8C) and an angular velocity $\omega n\text{-}1$ ($\omega(4)$) calculated from the required rotation time of a cylinder (the fourth cylinder #4) that reaches the expansion stroke immediately before (i.e. one expansion stroke before) the misfire determination subject cylinder.

$$\Delta\omega 1 = \omega n\text{-}1 - \omega n \quad (1)$$

A second angular velocity variation amount $\Delta\omega 2$ ($d\omega 3$) is defined by a following equation as a difference between an angular velocity $\omega n\text{-}2$ ($\omega(3)$) calculated from the required rotation time of a cylinder (the third cylinder #3) two expansion strokes before the misfire determination subject cylinder and an angular velocity $\omega n\text{-}3$ ($\omega(3)$) calculated from the required rotation time of a cylinder (the first cylinder #1) three expansion strokes before the misfire determination subject cylinder.

$$\Delta\omega 2 = \omega n\text{-}3 - \omega n\text{-}2 \quad (2)$$

A rotation variation amount $\Delta NE$ is a difference between the first angular velocity variation amount $\Delta\omega 1$ and the second angular velocity variation amount $\Delta\omega 2$. Hence, the rotation variation amount $\Delta NE$ ($dN5$) is expressed by a following equation.

$$\Delta NE = \Delta\omega 1 - \Delta\omega 2 = (\omega n\text{-}1 - \omega n) - (\omega n\text{-}3 - \omega n\text{-}2) \quad (3)$$

As shown in FIGS. 8A to 8C, when a misfire occurs in a current cylinder (the second cylinder #2, for example) while combustion occurs normally (i.e. no misfires occur) in the other cylinders, the value of the angular velocity $\omega n$ ($\omega$ (5)) in the current cylinder becomes smaller than the "angular velocities $\omega n\text{-}1$ ($\omega$ (4)), $\omega n\text{-}2$ ($\omega$ (3)), $\omega n\text{-}3$ ($\omega$ (2))" serving as the other angular velocities shown in FIGS. 8A to 8C (see FIG. 8A). As a result, the first angular velocity variation amount $\Delta\omega 1$ ($d\omega 5$) shown in FIGS. 8A to 8C takes a comparatively large positive value, while the second angular velocity variation amount $\Delta\omega 2$ ($d\omega 3$) shown in FIGS. 8A to 8C takes a value of substantially "0" (see FIG. 8B). In this case, therefore, as shown in FIG. 8C, the rotation variation amount ΔNE (dN5) relating to the current cylinder (the second cylinder #2 in this case) takes a comparatively large positive value that exceeds a predetermined threshold ΔNEth.

The cylinder that reaches the expansion stroke next after the second cylinder #2 is the first cylinder #1. When the first cylinder #1 becomes the current cylinder (i.e. when the first cylinder #1 reaches the expansion stroke), fuel burns normally, but since the misfire has only just occurred, the angular velocity ωn (ω (6)) of the current cylinder has not yet recovered to an average angular velocity ωave. Nevertheless, the angular velocity ωn-1 (ω (5)) of the immediately preceding cylinder is smaller than the angular velocity ωn (ω (6)) of the current cylinder, and therefore an absolute value of the first angular velocity variation amount Δω1 (dω6) takes a comparatively small negative value. Meanwhile, the second angular velocity variation amount Δω2 (dω4) takes a value of substantially "0". In this case, therefore, an absolute value of the rotation variation amount ΔNE relating to the first cylinder #1 takes a comparatively small negative value that does not exceed the predetermined threshold ΔNEth.

Further, the cylinder that reaches the expansion stroke next after the first cylinder #1 is the third cylinder #3. Once the third cylinder #3 becomes the current cylinder, the angular velocity ωn (ω (7)) of the current cylinder has recovered to the average angular velocity ωave. At this time, the absolute value of the first angular velocity variation amount Δω1 (dω7) takes a comparatively small negative value, while Δω2 (dω5) takes a comparatively large positive value. In this case, therefore, the absolute value of the rotation variation amount ΔNE (dN7) relating to the third cylinder #3 takes a comparatively large negative value that does not exceed the predetermined threshold ΔNEth.

The cylinder that reaches the expansion stroke next after the third cylinder #3 is the fourth cylinder #4. When the fourth cylinder #4 is the current cylinder, the first angular velocity variation amount Δω1 (dω8) takes a value of substantially "0", and the absolute value of the second angular velocity variation amount Δω2 (dω6) takes a comparatively small negative value. In this case, therefore, the rotation variation amount ΔNE relating to the fourth cylinder #4 takes a comparatively small positive value that still does not exceed the predetermined threshold ΔNEth.

As is evident from the above description, the rotation variation amount ΔNE of the cylinder (the second cylinder #2 in the example shown in FIGS. 8A to 8C) in which the misfire occurs takes a large positive value exceeding the predetermined determination threshold ΔNEth. Hence, the conventional apparatus determines that a misfire has occurred when the rotation variation amount ΔNE exceeds the determination threshold ΔNEth.

SUMMARY OF THE INVENTION

In the conventional apparatus, however, when an engine rotation velocity increases temporarily due to factors such as disturbances accompanying vehicle travel and past misfires, the rotation variation amount ΔNE may exceed the predetermined determination threshold ΔNEth as a result such that a misfire is detected erroneously even though a misfire has not actually occurred. The aforementioned disturbances accompanying vehicle travel include vehicle vibration during travel on a bad road, torsion in a driving system when a vehicle wheel slips and a clutch is engaged and disengaged, and so on, for example. An example of erroneous detection of a misfire by the conventional apparatus will be described below with reference to FIGS. 9A to 9C.

For example, when the rotation velocity (the angular velocity) increases at the second cylinder #2 due to the effects of disturbances accompanying vehicle travel, the value of the angular velocity ωn (ω (4)) in the current cylinder (the second cylinder #2) becomes larger than the values of the angular velocities ωn-1 (ω (3)), ωn-2 (ω (2)), and ωn-3 (ω (1)) in the cylinders preceding the current cylinder (see FIG. 9A). As a result, the first angular velocity variation amount Δω1 (dω4) at this time takes a comparatively large negative value, while the second angular velocity variation amount Δω2 (dω2) takes a value of substantially "0" (see FIG. 9B). In this case, therefore, as shown in FIG. 9C, the rotation variation amount ΔNE (dN4) relating to the second cylinder #2 takes a comparatively large negative value that does not exceed the predetermined threshold ΔNEth.

The cylinder that reaches the expansion stroke next after the second cylinder #2 is the first cylinder #1. When the first cylinder #1 becomes the current cylinder (i.e. when the first cylinder #1 reaches the expansion stroke), the angular velocity ωn (ω (5)) takes a smaller value than the angular velocity in the immediately preceding cylinder. At this time, the absolute value of the first angular velocity variation amount Δω1 (dω5) in Equation (3) takes a comparatively small positive value, while the second angular velocity variation amount Δω2 (dω3) takes a value of substantially "0" (see FIG. 9B). In this case, therefore, the absolute value of the rotation variation amount ΔNE (dN5) relating to the first cylinder #1 takes a comparatively small positive value that does not exceed the predetermined threshold ΔNEth.

Further, the cylinder that reaches the expansion stroke next after the first cylinder #1 is the third cylinder #3. Once the third cylinder #3 becomes the current cylinder, the angular velocity ωn (ω (6)) has recovered to the average angular velocity ωave. At this time, the absolute value of the first angular velocity variation amount Δω1 (dω6) takes a comparatively small positive value, whereas the absolute value of the second angular velocity variation amount Δω2 (dω4) at this time takes a comparatively large negative value. In this case, therefore, the rotation variation amount ΔNE (dN6) relating to the third cylinder #3 takes a comparatively large positive value that exceeds the predetermined determination threshold ΔNEth even though a misfire has not occurred.

The cylinder that reaches the expansion stroke next after the third cylinder #3 is the fourth cylinder #4. When the fourth cylinder #4 is the current cylinder, the first angular velocity variation amount Δω1 (dω7) takes a value of substantially "0" while the second angular velocity variation amount Δω2 (dω5) takes a comparatively small positive value. In this case, therefore, the absolute value of the rotation variation amount ΔNE relating to the fourth cylinder #4 takes a comparatively small negative value that does not exceed the predetermined threshold ΔNEth.

As is evident from the above description, in the conventional apparatus, a misfire is erroneously determined to have occurred, despite not having actually occurred, two cylinders after (i.e. in the cylinder 360° CA after) the cylinder (the second cylinder #2 in the example shown in FIGS. 9A to 9C) in which the rotation speed increased.

The invention has been designed in consideration of the problem described above. More specifically, the invention provides a misfire determination apparatus that is unlikely to determine a misfire erroneously when a misfire has not actually occurred due to the effect of a temporary increase in an engine rotation velocity.

An aspect of the invention provides a misfire determination apparatus (referred to hereafter as the "apparatus of the invention") for an internal combustion engine, having an angular velocity variation amount acquisition unit, a rotation variation amount acquisition unit, and a misfire determination unit.

The angular velocity variation amount acquisition unit is configured to (i) obtain a crank angle velocity on the basis of a time required for a crankshaft to rotate through a predetermined rotation angle width from a first crank angle to a second crank angle during an expansion stroke of each cylinder of the multi-cylinder internal combustion engine, and (ii) obtain an angular velocity variation amount, which is a difference in the crank angle velocity between two cylinders that reach the expansion stroke consecutively.

The rotation variation amount acquisition unit is configured to obtain a rotation variation amount, which is a difference between a first angular velocity variation amount and a second angular velocity variation amount. The first angular velocity variation amount is obtained by the angular velocity variation amount acquisition unit during the expansion stroke of an arbitrary cylinder among the respective cylinders. The second angular velocity variation amount has been obtained by the angular velocity variation amount acquisition unit in relation to a cylinder that has reached the expansion stroke in a Nth revolution of the crankshaft before the arbitrary cylinder reaches the expansion stroke. Here, the N is a positive integer.

The misfire determination unit is configured to: when the rotation variation amount obtained by the rotation variation amount acquisition unit exceeds a predetermined threshold, (i) determine that a misfire has not occurred in the internal combustion engine when a predetermined condition is established. the predetermined condition being established when a magnitude of the second angular velocity variation amount is greater than a magnitude of the first angular velocity variation amount and the second angular velocity variation amount has a sign by which a value of the rotation variation amount relating to the arbitrary cylinder is oriented in a direction for exceeding the predetermined threshold, and (ii) determine that a misfire has occurred in the internal combustion engine when the predetermined condition is not established.

As described above, when the second angular velocity variation amount $\Delta\omega 2$ takes a large negative value due to a temporary increase in the angular velocity $\omega$ at which the crankshaft rotates, the rotation variation amount $\Delta NE$ takes a large positive value. The reason for this is that the angular velocity "$\omega n$-2" in Equation (3) increases in comparison with the angular velocities in the cylinders to the front and rear thereof. The reason why the value of the rotation variation amount $\Delta NE$ increases when a misfire occurs, on the other hand, is that the angular velocity "$\omega n$" in Equation (3) decreases in comparison with the angular velocities in the cylinders to the front and rear thereof.

It may therefore be said that when the magnitude (the absolute value) of the first angular velocity variation amount $\Delta\omega 1$ including the angular velocity $\omega n$ equals or exceeds the magnitude (the absolute value) of the second angular velocity variation amount $\Delta\omega 2$ including the angular velocity $\omega n$-2, a "misfire" to be detected is highly likely to be the cause thereof, whereas when the magnitude (the absolute value) of the first angular velocity variation amount $\Delta\omega 1$ is smaller than the magnitude (the absolute value) of the second angular velocity variation amount $\Delta\omega 2$, a temporary increase in the angular velocity occurring at the point where the angular velocity $\omega n$-2 is obtained is highly likely to be the cause thereof.

Therefore, the determination apparatus determines which of the two factors (the angular velocity $\omega n$-2 and the angular velocity $\omega n$) causing the value of the rotation variation amount $\Delta NE$ to take a large positive value is dominant by comparing the first angular velocity variation amount $\Delta\omega 1$ with the second angular velocity variation amount $\Delta\omega 2$ (see Equations (4) and (5) below).

$$|\Delta\omega 1|<|\Delta\omega 2| \quad (4)$$

or in other words $$|\omega n\text{-}1 - \omega n| < |\omega n\text{-}3 - \omega n\text{-}2| \quad (5)$$

For example, when the predetermined threshold $\Delta NEth$ is set at a "positive" value and the second angular velocity variation amount $\Delta\omega 2$ having the angular velocity $\omega n$-2 as a component takes a "negative" value (has a negative sign), the second angular velocity variation amount $\Delta\omega 2$ acts as the factor that causes the rotation variation amount $\Delta NE$ to increase. In other words, when the second angular velocity variation amount $\Delta\omega 2$ takes a negative value (has a negative sign), the second angular velocity variation amount $\Delta\omega 2$ orients the rotation variation amount $\Delta NE$ in a direction for exceeding the value of the predetermined threshold $\Delta NEth$. To put it another way, when the second angular velocity variation amount $\Delta\omega 2$ takes a "positive" value (has a positive sign), the second angular velocity variation amount $\Delta\omega 2$ acts as a factor that causes the rotation variation amount $\Delta NE$ to decrease.

Therefore, the determination apparatus sets the predetermined condition to be established not only when the condition shown in Equation (4) is satisfied, but also when the second angular velocity variation amount $\Delta\omega 2$ has a sign by which the value of the rotation variation amount $\Delta NE$ in the arbitrary cylinder is oriented in a direction for exceeding the predetermined threshold. More specifically, when the rotation variation amount $\Delta NE$ is defined by Equation (3) (when the second angular velocity variation amount is subtracted from the first angular velocity variation amount), the predetermined condition is set to be established when the sign of the second angular velocity variation amount is different to the sign of the predetermined threshold $\Delta NEth$. Conversely, when the rotation variation amount $\Delta NE$ is defined as a value obtained by subtracting the first angular velocity variation amount from the second angular velocity variation amount, the predetermined condition is set to be established when the sign of the second angular velocity variation amount is identical to the sign of the predetermined threshold $\Delta NEth$. When the predetermined condition is established, the determination apparatus determines that "a misfire has not occurred in the internal combustion engine even though the rotation variation amount $\Delta NE$ has exceeded the predetermined threshold $\Delta NEth$" in the arbitrary cylinder.

Hence, the misfire determination unit is capable of determining whether or not a misfire has occurred by determining "whether the factor causing the rotation variation amount $\Delta NE$ to exceed the predetermined threshold $\Delta NEth$ is a misfire to be detected or a past increase in the angular velocity variation amount $\Delta\omega$". According to the apparatus of the invention, therefore, erroneous determination of a misfire when a misfire has not actually occurred due to the effect of a temporary increase in the engine rotation velocity can be prevented.

Further, in the misfire determination apparatus for an internal combustion engine, the misfire determination unit may be configured to execute the misfire determination after replacing the rotation variation amount in the arbitrary cylinder with a value that does not exceed the predetermined threshold when the predetermined condition is established.

The predetermined threshold used in the misfire determination is often determined on the basis of the rotation velocity and the load of the internal combustion engine. Moreover, the predetermined threshold may be modified for each type (model) of vehicle in which the determination apparatus is installed.

Hence, in the misfire determination apparatus, the misfire determination unit may be configured to execute the misfire determination after replacing the rotation variation amount in the arbitrary cylinder with "0" when the predetermined condition is established.

According to the misfire determination apparatus described above, the rotation variation amount can be set reliably at a smaller value than the predetermined threshold set at that time.

Other objects, features, and accompanying advantages of the invention will easily become apparent from the description of the embodiments of the invention, which are described below with reference to the drawings.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 5A to 5C are time charts illustrating an operation of a "misfire determination apparatus" according to a modified example of this embodiment of the invention;

FIG. 6 is a flowchart showing a "rotation variation amount acquisition routine" according to a third modified example of this embodiment of the invention;

FIGS. 8A to 8C are time charts illustrating a misfire determination method employed in the related art; and FIGS. 9A to 9C are time charts illustrating a reason why a misfire is detected erroneously in the related art.

DETAILED DESCRIPTION OF EMBODIMENTS

A misfire determination apparatus (also referred to as "the determination apparatus" hereafter) for an internal combustion engine according to an embodiment of the invention will be described below with reference to the drawings.

Figure 1:
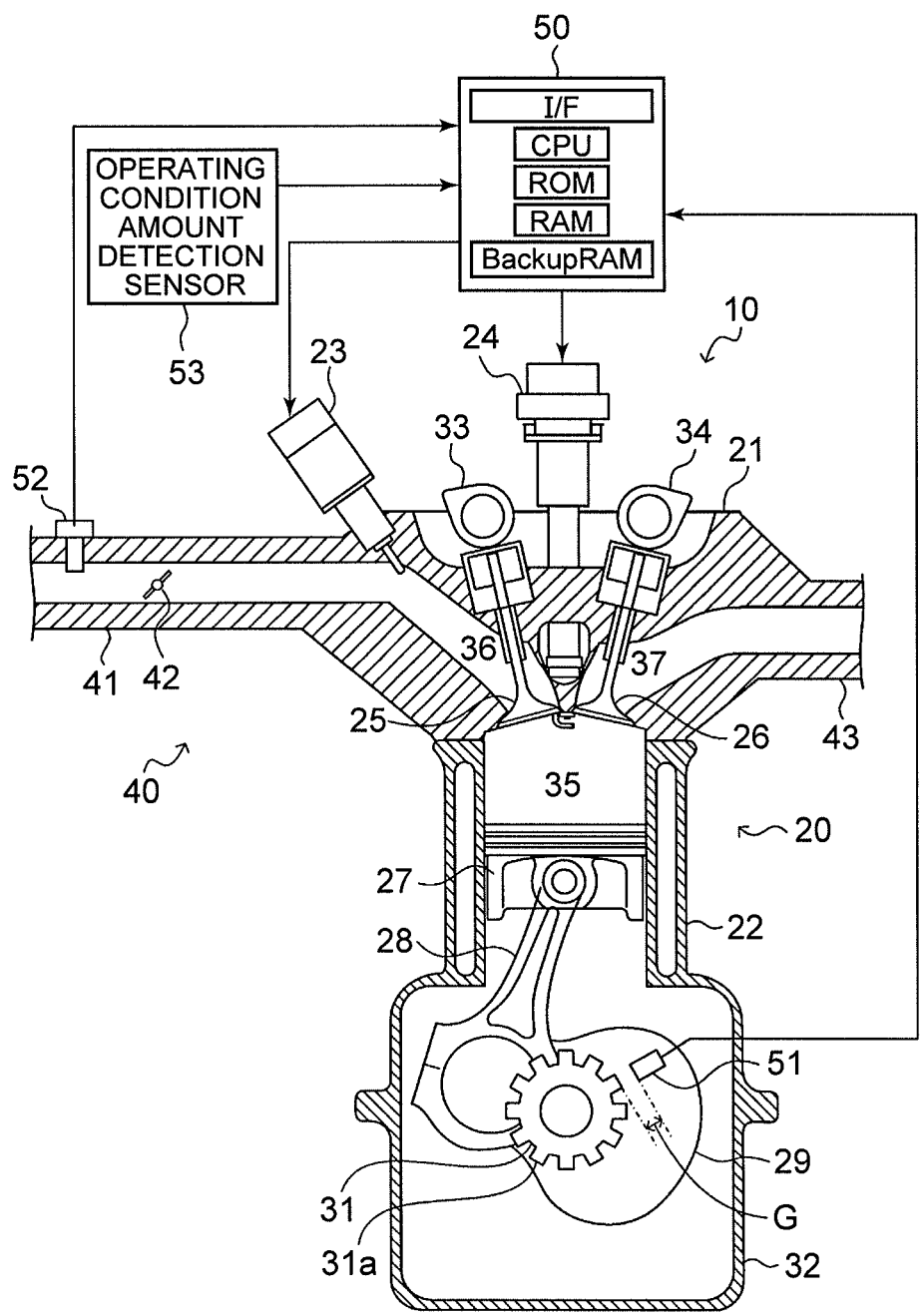
FIG. 1 is a schematic view showing a configuration of an internal combustion engine to which a "misfire determination apparatus" according to an embodiment of the invention is applied.

The determination apparatus is applied to an internal combustion engine 10 shown in FIG. 1. The engine 10 is a spark ignition, four-stroke cycle reciprocating piston, V6 type gasoline internal combustion engine. The engine 10 includes an engine main body portion 20 and an intake/exhaust system 40.

The engine main body portion 20 includes a cylinder head 21, a cylinder block 22, a fuel injection valve 23, an ignition apparatus 24, an intake valve 25, an exhaust valve 26, a piston 27, a connecting rod 28, a crankshaft 29, a timing rotor 31, a crank case 32, an intake cam 33, and an exhaust cam 34.

A combustion chamber 35 is formed in the engine main body portion 20 by the cylinder head 21, the cylinder block 22, and the piston 27. An intake port 36 is formed in the engine main body portion 20 on an intake side of the cylinder head 21. The intake port 36 communicates with the combustion chamber 35. An exhaust port 37 is formed in the engine main body portion 20 on an exhaust side of the cylinder head 21. The exhaust port 37 communicates with the combustion chamber 35.

The fuel injection valve 23 is configured to inject fuel into the intake port 36. The ignition apparatus 24 is disposed on the cylinder head 21 such that a spark generation portion thereof is exposed to the interior of the combustion chamber 35. The ignition apparatus 24 includes an igniter, an ignition coil, and a spark plug. When the intake cam 33 rotates, the intake valve 25 performs a reciprocating motion while following a cam nose of the intake cam 33, and as a result, a communicating portion between the combustion chamber 35 and the intake port 36 is opened and closed. When the exhaust cam 34 rotates, the exhaust valve 26 performs a reciprocating motion while following a cam nose of the exhaust cam 34, and as a result, a communicating portion between the combustion chamber 35 and the exhaust port 37 is opened and closed.

The crankshaft 29 is coupled to the piston 27 via the connecting rod 28, which is housed in the crank case 32, and is configured to rotate in conjunction with a reciprocating motion of the piston 27.

The timing rotor 31 is disposed on an axial end portion of the crankshaft 29 and configured to rotate integrally with the crankshaft 29. The timing rotor 31 includes outer teeth 31a formed at 30° intervals on an outer peripheral surface thereof. The outer teeth 31a of the timing rotor 31 include mechanical dimension errors such as a manufacturing error. Therefore, variation tends to be detected over a 360° CA period in a rotation synchronization signal of the timing rotor, which is output by a crank position sensor 51 to be described below.

The intake/exhaust system 40 includes an intake passage portion 41 having an intake passage formed in an interior thereof, a throttle valve 42, and an exhaust passage portion 43 having an exhaust passage formed in an interior thereof. The intake passage portion 41 communicates with the intake port 36. The exhaust passage portion 43 communicates with the exhaust port 37.

The throttle valve 42 is disposed in the intake passage portion 41 and configured so as to be driven by a throttle motor, not shown in the drawings. The throttle valve 42 is configured such that an opening thereof is modified in accordance with a motor control amount calculated by an electronic control apparatus (ECU) 50, to be described below, and output to the throttle motor. An intake air amount introduced into the intake passage portion 41 is adjusted in accordance with the opening of the throttle valve 42.

Fuel injected into the intake port 36 from the fuel injection valve 23 forms an air-fuel mixture with the intake air in the intake passage portion 41. When the intake valve 25 opens in an intake stroke of the internal combustion engine 10, the air-fuel mixture is introduced into the combustion chamber 35. The air-fuel mixture introduced into the combustion chamber 35 is compressed in a compression stroke, and then ignited and burned/exploded by the ignition apparatus 24 at a predetermined timing. In other words, an expansion stroke begins. When the exhaust valve 26 opens in an exhaust stroke, burned exhaust gas is discharged to the exhaust passage portion 43. This series of strokes (a combustion cycle constituted by intake, compression, expansion, and exhaust) is executed in the six cylinders in succession so that the crankshaft 29 rotates continuously. Ignition is performed in the internal combustion engine 10 in order of a first cylinder #1, a second cylinder #2, a third cylinder #3, a fourth cylinder #4, a fifth cylinder #5, and a sixth cylinder #6.

The ECU 50 is an electronic circuit formed from a conventional microcomputer, and includes a CPU, a read only memory (ROM), a random access memory (RAM), a backup RAM (a static RAM or a nonvolatile memory), an interface, and so on. The ECU 50 is electrically connected to the fuel injection valve 23, the ignition apparatus 24, the throttle motor, and so on.

The ECU 50 is configured to transmit instruction (drive) signals to actuators of the fuel injection valve 23, the ignition apparatus 24, and so on in response to instructions from the CPU. Further, the ECU 50 is electrically connected to the crank position sensor 51, an air flow meter 52, an operating condition amount detection sensor 53, and so on, and is configured to receive input signals from these respective sensors.

The crank position sensor 51 is a sensor that detects a rotation position of the crankshaft 29. The crank position sensor 51 is disposed in the crank case 32 such that a predetermined air gap G is formed between the crank position sensor 51 and the timing rotor 31. When the timing rotor 31 rotates in conjunction with the rotation of the crankshaft 29, the air gap G varies in size as the outer teeth 31a approach and retreat. As a result, magnetic flux by which a coil, not shown in the drawing, provided inside the crank position sensor 51 is energized increases and decreases such that electromotive force is generated in the coil. This electromotive force is oriented in opposite directions when the outer teeth 31a approach and retreat, and therefore forms an alternating current signal.

The crank position sensor 51 further includes a waveform shaper, not shown in the drawing, that shapes the aforesaid alternating current signal into a predetermined pulse signal and outputs the pulse signal. In other words, the crank position sensor 51 is configured to output a pulse signal in synchronization with the passage of the outer teeth 31a. Note that a timing rotor on which outer teeth are formed at 10° intervals may also be applied as the timing rotor 31. In this case, pulse signal output by the crank position sensor 51 is frequency-divided by the ECU 50 so as to be converted into pulse output at 30° CA intervals.

The air flow meter 52 is disposed in the intake passage portion 41 in a position further toward an intake upstream side than the throttle valve 42. The air flow meter 52 detects an amount of intake air flowing through the intake passage portion 41. The ECU 50 calculates an intake air amount Ga per unit time on the basis of an output signal from the air flow meter 52.

The operating condition amount detection sensor 53 includes an accelerator pedal depression amount sensor that detects an accelerator pedal depression amount Accp, an intake air pressure sensor that detects an intake air pressure Pm in the intake passage portion 41 in a position downstream of the throttle valve 42, an air-conditioner sensor that detects an operative/inoperative condition of an air-conditioner of a vehicle in which the internal combustion engine 10 is installed, a shift lever sensor that detects an operation of a shift lever provided in the vehicle in which the internal combustion engine 10 is installed, and so on.

(Operation)

Next, an operation of the determination apparatus will be described. The determination apparatus determines whether or not a misfire has occurred on the basis of a "rotation variation amount", which is an amount indicating a degree of variation in an internal combustion engine rotation velocity NE. First, the definition of the "rotation variation amount" will be described.

As regards the "rotation variation amount", first, similarly to JP 4-365958 A described above, a required rotation time from compression top dead center TDC to 30° CA after TDC, or in other words a 30° CA required time T30, is obtained during the expansion stroke of each cylinder.

Next, the determination apparatus calculates an angular velocity ωn from the obtained 30° CA required time T30. Note that in this embodiment, "n" denotes the current cylinder, and "n-1" denotes the cylinder that reaches the expansion stroke immediately before the current cylinder. The angular velocity ωn is expressed by a following equation. More specifically, the angular velocity ωn takes a smaller value when a misfire occurs than when combustion/explosion occurs normally.

$$\omega n = 30/T30 \tag{6}$$

An angular velocity variation amount Δω is defined by a following equation as a difference between an angular velocity ωk-1 in a cylinder in which ignition is performed approximately 120° CA before an arbitrary cylinder used as a reference (in other words, a cylinder that reaches the expansion stroke immediately before the arbitrary cylinder) and an angular velocity ωk in the arbitrary cylinder.

$$\Delta\omega = \omega k\text{-}1 - \omega k \tag{7}$$

An angular velocity variation amount Δω defined specifically as a difference between an angular velocity ωn-1 in a cylinder in which ignition is performed approximately 120° CA before a cylinder (the current cylinder) currently in the expansion stroke (in other words, a cylinder that reaches the expansion stroke immediately before the current cylinder) and the angular velocity ωn in the current cylinder will be referred to as a "first angular velocity variation amount Δω1". The first angular velocity variation amount Δω1 is expressed by a following equation.

$$\Delta\omega 1 = \omega n\text{-}1 - \omega n \tag{8}$$

Further, an angular velocity variation amount Δω defined as a difference between an angular velocity ωn-7 in a cylinder in which ignition is performed approximately 840° CA before the current cylinder used as the reference and an angular velocity ωn-6 in a cylinder in which ignition is performed approximately 720° CA before the current cylinder used as the reference (in other words, the same cylinder as the current cylinder in the four-stroke cycle internal combustion engine) will be referred to as a "second angular velocity variation amount Δω2". The second angular velocity variation amount Δω2 is expressed by a following equation.

$$\Delta\omega 2 = \omega n\text{-}7 - \omega n\text{-}6 \tag{9}$$

The rotation variation amount ΔNE is defined as a difference between the first angular velocity variation amount Δω1 and the second angular velocity variation amount Δω2. In other words, the rotation variation amount ΔNE is expressed by a following equation.

$$\Delta NE = \Delta\omega 1 - \omega 2 = (\omega n\text{-}1 - \omega n) - (\omega n\text{-}7 - \omega n\text{-}6) \qquad (10)$$

Hence, the determination apparatus calculates the rotation variation amount ΔNE as a difference in the angular velocity variation amount Δω over a 720° CA period (a period of an integral multiple of 360° CA). More specifically, the determination apparatus calculates the angular velocity variation amount Δω from the 30° CA required times T30 obtained using identical outer teeth of the timing rotor 31, and calculates the difference between the obtained 30° CA required times T30 as the rotation variation amount ΔNE. Therefore, even when the pitch of the outer teeth 31a of the timing rotor 31 is not set accurately at equal intervals due to a manufacturing error, for example, the calculated rotation variation amount ΔNE is not affected by the manufacturing error in the timing rotor 31. As a result, the determination apparatus can obtain the rotation variation amount ΔNE accurately.

Further, the determination apparatus calculates the difference in the angular velocity variation amount Δω over a 720° CA period (a period in which the crankshaft 29 performs two revolutions), and therefore variation caused by manufacturing errors among the cylinders of the internal combustion engine 10 can be eliminated in addition to variation caused by the manufacturing error in the timing rotor 31.

Next, a specific operation of the invention will be described with reference to FIGS. 2A to 2D. FIGS. 2A to 2D are time charts showing relationships between the angular velocity, shown in FIG. 2A, the angular velocity variation amount, shown in FIG. 2B, the rotation variation amount, shown in FIG. 2C, and a misfire determination rotation variation amount, shown in FIG. 2D. Note that FIGS. 2A to 2D show an example in which the angular velocity increases in the first cylinder #1.

Figure 2A:
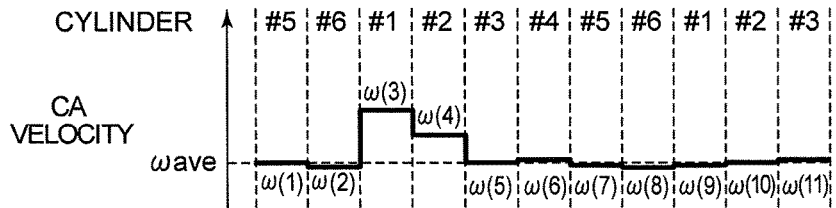
FIGS. 2A to 2D are time charts illustrating an operation of the "misfire determination apparatus" according to this embodiment of the invention.

As can be seen in FIGS. 2A to 2D, the internal combustion engine is operated at an approximately average rotation velocity (an angular velocity ωave), but for some reason the angular velocity increases when the first cylinder #1 reaches the expansion stroke (ω (3) in FIG. 2A).

Figure 2B:
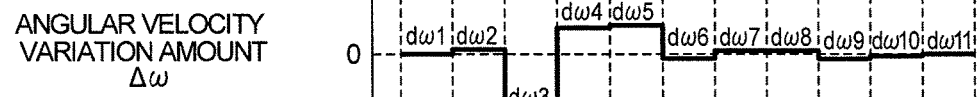
Figure 2C:
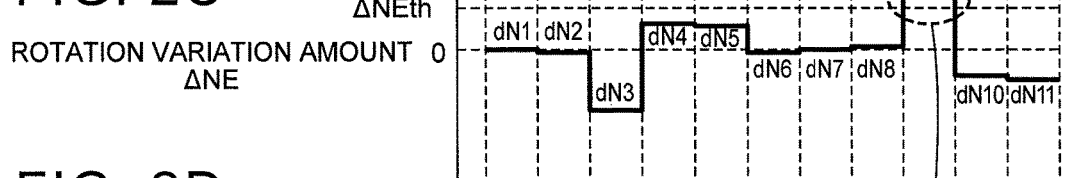
Figure 2D:
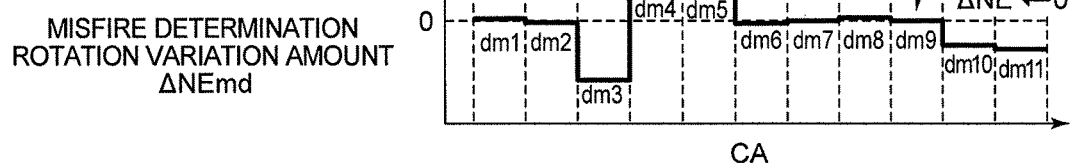

As described above, the first angular velocity variation amount Δω1 is the difference between the angular velocity ωn-1 (ω (2)) in the cylinder one cylinder before the current cylinder (the first cylinder #1) and the angular velocity ωn (ω (3)) of the current cylinder, and therefore an absolute value thereof takes a comparatively large negative value (dω3 in FIG. 2B). As described above, the second angular velocity variation amount Δω2 is the difference between the angular velocity ωn-7 in the cylinder 840° CA before the current cylinder and the angular velocity ωn-6 of the cylinder 720° CA before the current cylinder. The internal combustion engine runs at the average angular velocity ωave, and therefore, although not shown in FIGS. 2A to 2D, the value of the second angular velocity variation amount Δω2 is substantially "0". As described above, the rotation variation amount ΔNE is the difference between the first angular velocity variation amount Δω1 (dω3) and the second angular velocity variation amount Δω2 (not shown), and therefore an absolute value thereof takes a comparatively large negative value (dN3 in FIG. 2C). As a result, the rotation variation amount ΔNE (dN3) in the first cylinder #1 does not exceed a predetermined threshold ΔNEth.

In the second cylinder #2, which reaches the expansion stroke next, the angular velocity ωn (ω (4)) has not yet recovered to the average angular velocity ωave, and is still higher than the average angular velocity ωave. At this time, the angular velocity variation amount Δω (dω4) takes a comparatively small positive value, and the rotation variation amount ΔNE (dN4) likewise takes a comparatively small positive value. In this case, the rotation variation amount ΔNE (dN4) in the second cylinder #2 does not exceed the predetermined threshold ΔNEth.

In the third cylinder #3, which reaches the expansion stroke next, the angular velocity ωn (ω (5)) has recovered to the substantially average angular velocity ωave. At this time, the angular velocity variation amount Δω (dω5) takes a comparatively small positive value, and therefore the rotation variation amount ΔNE (dN5) in the third cylinder #3 takes a comparatively small positive value that does not exceed the predetermined threshold ΔNEth.

When the first cylinder #1 reaches the expansion stroke again, the angular velocity ωn (ω (9)) is at the substantially average angular velocity ωave, and the angular velocity ωn-1 (ω (8)) in the immediately preceding cylinder (the sixth cylinder #6) is also at the substantially average angular velocity ωave. Hence, the value of the angular velocity variation amount Δω (dω9) at this time is substantially "0". Moreover, as regards the rotation variation amount ΔNE (dN9) at this time, the angular velocity variation amount in the current cylinder is calculated as the first angular velocity variation amount Δω1 (dω9) while the angular velocity variation amount in the cylinder 720° CA before the current cylinder is calculated as the second angular velocity variation amount Δω2 (dω3). The absolute value of the second angular velocity variation amount Δω2 (dω3) at this time takes a comparatively large negative value, and therefore the rotation variation amount ΔNE (dN9) at this time takes a comparatively large positive value that exceeds the predetermined threshold ΔNEth. Hence, when a misfire determination is performed on the basis of the calculated rotation variation amount ΔNE, a misfire is determined to have occurred in the first cylinder #1 even though a misfire has not occurred.

Next, therefore, the determination apparatus determines whether or not the first angular velocity variation amount Δω1 and the second angular velocity variation amount Δω2 satisfy both of two relationships (a predetermined condition) described below in order to calculate the "misfire determination rotation variation amount ΔNEmd" for use in the misfire determination.

A first predetermined condition is satisfied when the magnitude of the first angular velocity variation amount Δω1 is smaller than the magnitude of the second angular velocity variation amount Δω2. In other words, the first predetermined condition is satisfied when $$|\Delta\omega 1| < |\Delta\omega 2| \qquad (11)$$

A second predetermined condition is satisfied when the second angular velocity variation amount Δω2 has a sign by which the value of the rotation variation amount ΔNE in the cylinder in the expansion stroke is oriented in a direction for exceeding the predetermined threshold ΔNEth. In this example, the predetermined threshold ΔNEth takes a positive value, and therefore the "direction for exceeding the predetermined threshold ΔNEth" is a direction for increasing the value of the rotation variation amount ΔNE in a positive direction. Accordingly, in this example, the second angular velocity variation amount Δω2 is capable of "increasing the value of the rotation variation amount ΔNE in a positive direction" when the second angular velocity variation amount $\Delta\omega 2$ has a negative sign. In other words, the second condition is expressed by a following equation.

$$\Delta\omega 2 < 0 \tag{12}$$

In this case, therefore, the "predetermined condition" (the first condition and the second condition) can be expressed by a following equation.

$$|\Delta\omega 1| < -\Delta\omega 2 \tag{13}$$

In this example (the example shown in FIGS. 2A to 2D), the first angular velocity variation amount $\Delta\omega 1$ (d$\omega$9) and the second angular velocity variation amount $\Delta\omega 2$ (d$\omega$3) satisfy the relationship shown in Equation (13). Accordingly, the determination apparatus replaces the value of the rotation variation amount $\Delta NE$ in the current cylinder (the first cylinder #1) with "0", and sets "0" as the misfire determination rotation variation amount $\Delta NEmd$ (dm9 in FIG. 2D). The reason why it is possible to perform the misfire determination on the basis of the above condition (the condition shown in Equation (13)) is as follows.

When the magnitude (the absolute value) of the first angular velocity variation amount $\Delta\omega 1$ (d$\omega$9) including the angular velocity $\omega n$ ($\omega$ (9)) is smaller than $-\Delta\omega 2$, which is obtained by inverting the sign of the second angular velocity variation amount $\Delta\omega 2$ (d$\omega$9) including the angular velocity $\omega n$-6 ($\omega$ (3)) (in other words, when Equation (13) is satisfied), a temporary increase in the angular velocity $\omega n$-6 ($\omega$ (3)) during acquisition of the angular velocity $\omega n$-6 may be said to be the main cause of the increase in the rotation variation amount $\Delta NE$. Therefore, the probability that "a misfire has not occurred" at this time may be considered high. When, on the other hand, the magnitude (the absolute value) of the first angular velocity variation amount $\Delta\omega 1$ equals or exceeds $-\Delta\omega 2$ obtained by inverting the sign of the second angular velocity variation amount $\Delta\omega 2$ (in other words, when Equation (13) is not satisfied), the probability that "the value of the rotation variation amount $\Delta NE$ has increased due to a misfire that is to be detected" may be considered high. The misfire determination rotation variation amount $\Delta NEmd$ for use in the misfire determination can therefore be calculated in the manner described above.

By applying the calculated misfire determination rotation variation amount $\Delta NEmd$ to a misfire determination routine to be described below, the determination apparatus can determine whether or not a misfire has occurred without determining erroneously that a misfire has occurred even though a misfire has not occurred.

Next, actual specific operations performed by the determination apparatus will be described. The CPU of the ECU 50 executes a "rotation variation amount acquisition routine" shown on a flowchart in FIG. 3 on an arbitrary cylinder of the internal combustion engine 10 when the CA of the arbitrary cylinder reaches compression top dead center TDC.

Hence, when the CA of one of the cylinders reaches compression top dead center TDC of the corresponding cylinder, the CPU starts processing from step 300 in FIG. 3, advances to step 310, executes processing of step 310 to step 340 in sequence, as described below, and then advances to step 350.

In step 310, the CPU obtains the 30° CA required time T30 (the time required for the CA of the arbitrary cylinder to rotate from TDC to 30° CA after TDC). In step 320, the CPU obtains the angular velocity $\omega n$ relating to the current cylinder in accordance with Equation (6). In step 330, the CPU obtains the angular velocity variation amount $\Delta\omega$ relating to the current cylinder in accordance with Equation (7). In step 340, the CPU obtains the rotation variation amount $\Delta NE$ relating to the current cylinder in accordance with Equation (10).

Note that the CPU stores the angular velocity $\omega n$, the angular velocity variation amount $\Delta\omega$, and the rotation variation amount $\Delta NE$ obtained respectively in steps 320 to 340 in the RAM in association with the cylinder number of the current cylinder.

Next, the CPU determines in step 350 whether or not the first angular velocity variation amount $\Delta\omega 1$ and the second angular velocity variation amount $\Delta\omega 2$ satisfy the condition ($|\Delta\omega 1| < -\Delta\omega 2$) of Equation (13). According to the "assumed condition", Equation (13) is satisfied. Therefore, after obtaining "Yes" in the determination of step 350, the CPU advances to step 360 and sets the value of the misfire detection determination rotation variation amount $\Delta NEmd$ at "0". The CPU then advances to step 395, where the current routine is terminated.

Figure 4:
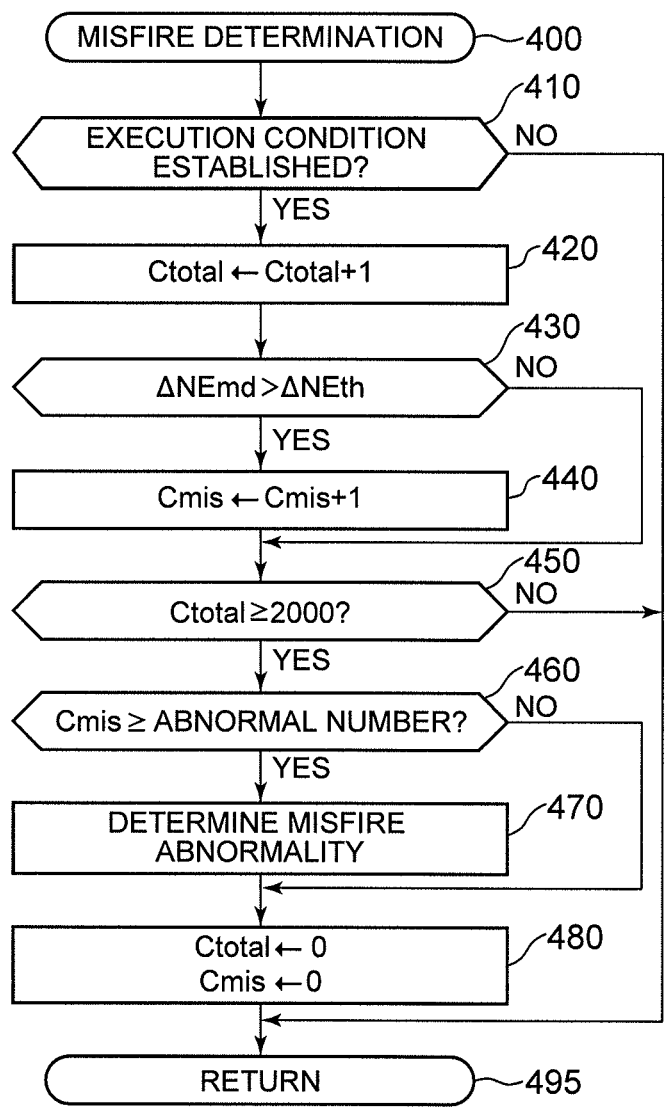
FIG. 4 is a flowchart showing a "misfire determination routine" executed by the CPU shown in FIG. 1.

The CPU of the ECU 50 also executes a "misfire determination routine" shown on a flowchart in FIG. 4 on an arbitrary cylinder of the internal combustion engine 10 when the CA of the arbitrary cylinder reaches 60° CA after compression top dead center TDC.

Hence, when the CA of one of the cylinders reaches 60° CA after compression top dead center TDC of the corresponding cylinder, the CPU starts processing from step 400 of FIG. 4 and then advances to step 410. In step 410, the CPU determines whether or not an "execution condition" for determining whether a misfire has occurred is established.

During the misfire determination, the internal combustion engine rotation velocity NE is preferably in a comparatively stable condition. Accordingly, the execution condition may be set to be established when, for example, a predetermined time has elapsed after switching the air-conditioner between the operative condition and the inoperative condition, a predetermined time has elapsed following a shift level operation, and so on. Further, the misfire determination is not executed during a fuel cut and in extremely low temperatures (lower than −10° C.).

When the execution condition is not established, the CPU obtains "No" in the determination of step 410 and advances directly to step 495, where the current routine is terminated. When the execution condition is established, on the other hand, the CPU executes processing described below. Several cases will be described below on the assumption that the execution condition remains established throughout.

First, a first case in which the misfire determination rotation variation amount $\Delta NEmd$ does not exceed the predetermined threshold $\Delta NEth$ will be described. After obtaining "Yes" in the determination of step 410, the CPU advances to step 420 and counts a total determination number counter Ctotal up. The total determination number counter Ctotal is set at "0" in an initial routine, not shown in the drawings, that is executed separately when an ignition key switch is switched from OFF to ON. The total determination number counter Ctotal indicates the number of times the processing of this routine has been performed to determine whether or not a misfire has occurred.

Figure 3:
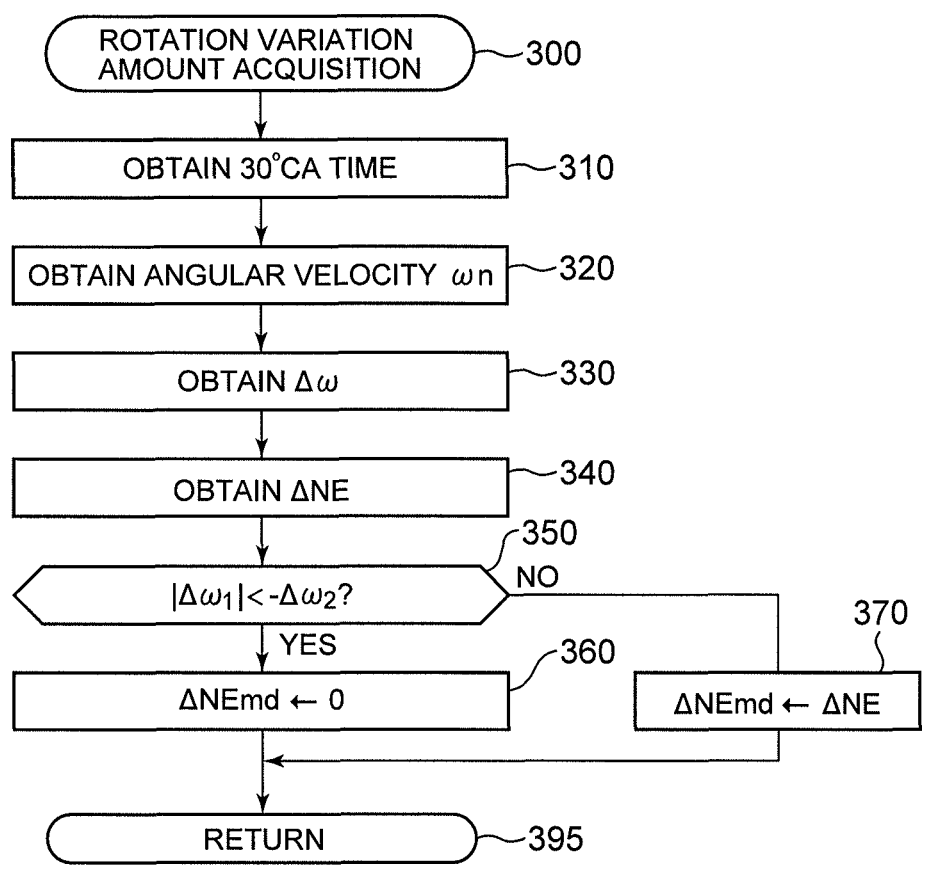
FIG. 3 is a flowchart showing a "rotation variation amount acquisition routine" executed by a central processing unit (CPU) shown in FIG. 1.

Next, the CPU advances to step 430 and determines whether or not the misfire determination rotation variation amount $\Delta NEmd$ obtained in the "rotation variation amount acquisition routine" shown in FIG. 3 is larger than the predetermined threshold $\Delta NEth$. In accordance with the aforesaid assumption, the misfire determination rotation variation amount $\Delta NEmd$ does not exceed the predetermined threshold $\Delta NEth$. Therefore, the CPU obtains "No" in the determination of step 430 and advances directly to step 450. In step 450, the CPU determines whether or not the total determination number counter Ctotal equals or exceeds "2000".

When, at this time, the value of the total determination number counter Ctotal is smaller than "2000", the CPU obtains "No" in the determination of step 450 and advances directly to step 495, where the current routine is terminated. When the routine is executed thereafter, the total determination number counter Ctotal is counted up in step 420 every time the execution condition of step 410 is established.

Next, a second case in which the misfire determination rotation variation amount ΔNEmd exceeds the predetermined threshold ΔNEth will be described. In this case, the CPU obtains "Yes" in the determination of step 430 after counting up the total determination number counter Ctotal in step 420, and then advances to step 440. In step 440, the CPU counts a misfire number counter Cmis up. The misfire number counter Cmis is set at "0" in the aforementioned initial routine. Accordingly, the value of the misfire number counter Cmis is increased by "1" from "0" every time "Yes" is obtained in the determination of step 430.

The CPU then advances to step 450. When the value of the total determination number counter Ctotal is smaller than "2000", the CPU obtains "No" in the determination of step 450 and advances directly to step 495, where the current routine is terminated. When the routine is executed thereafter, the total determination number counter Ctotal is counted up in step 420 every time the execution condition of step 410 is established.

When the processing (the "first case" and the "second case") described above is executed repeatedly, the value of the total determination number counter Ctotal reaches "2000". In this case, when the CPU advances to step 450, the CPU obtains "Yes" in the determination of step 450 and then advances to step 460. In step 460, the CPU determines whether or not the value of the misfire number counter Cmis equals or exceeds a prescribed abnormal number ("30", for example).

When the value of the misfire number counter Cmis equals or exceeds the prescribed abnormal number, the CPU obtains "Yes" in the determination of step 460 and then advances to step 470. In step 470, the CPU determines that "a misfire abnormality (a misfire) has occurred". At this time, the CPU illuminates a warning lamp provided in a vehicle cabin, and writes information indicating that a misfire has occurred to the backup RAM. Next, the CPU advances to step 480 in order to set the respective values of the total determination number counter Ctotal and the misfire number counter Cmis at "0", and then advances to step 495, where the current routine is terminated.

When the value of the misfire number counter Cmis is smaller than the prescribed abnormal number, on the other hand, the CPU obtains "No" in the determination of step 460 and advances directly to step 480. The CPU then advances to step 495, where the current routine is terminated. At this time, the CPU may write information indicating that "a misfire abnormality is determined not to have occurred" to the backup RAM.

As described above, the determination apparatus includes the angular velocity variation amount acquisition unit that obtains the CA velocity ωn (step 320 in FIG. 3) on the basis of the time (the required rotation time T30) required for the crankshaft 29 to rotate through a predetermined rotation angle width from a first CA to a second CA during the expansion stroke of each cylinder (the first cylinder #1 to the sixth cylinder #6) of the multi-cylinder (six-cylinder, for example) internal combustion engine, and obtains the angular velocity variation amount Δω (step 330 in FIG. 3), which is the difference in the CA velocity ωn between two cylinders that reach the expansion stroke consecutively, the rotation variation amount acquisition unit that obtains the rotation variation amount ΔNE (step 340 in FIG. 3), which is the difference between the first angular velocity variation amount Δω1 obtained by the angular velocity variation amount acquisition unit during the expansion stroke of an arbitrary cylinder among the respective cylinders and the second angular velocity variation amount Δω2 obtained by the angular velocity variation amount acquisition unit in relation to the cylinder that reaches the expansion stroke N (where N is a positive integer; in this case N=2) revolutions of the crankshaft 29 before the expansion stroke of the arbitrary cylinder, and the misfire determination unit that (1) determines that a misfire has not occurred in the internal combustion engine (obtains "No" in the determination of step 430 in FIG. 4 after the misfire determination rotation variation amount ΔNEmd is set at "0" in step 360 of FIG. 3) when the rotation variation amount ΔNE obtained by the rotation variation amount acquisition unit exceeds the predetermined threshold ΔNEth and the predetermined condition is established (when "Yes" is obtained in the determination of step 350 in FIG. 3), the predetermined condition being established when the magnitude |Δω2| of the second angular velocity variation amount Δω2 is greater than the magnitude |Δω1| of the first angular velocity variation amount Δω1 and the second angular velocity variation amount Δω2 has a sign by which the value ΔNE of the rotation variation amount in the arbitrary cylinder is oriented in a direction for exceeding the predetermined threshold ΔNEth, and (2) determines that a misfire has occurred in the internal combustion engine (obtains "Yes" in the determination of step 430 in FIG. 4 after the misfire determination rotation variation amount ΔNEmd is set at the rotation variation amount ΔNE in step 370 of FIG. 3) when the rotation variation amount ΔNE obtained by the rotation variation amount acquisition unit exceeds the predetermined threshold ΔNEth and the predetermined condition is not established (when "No" is obtained in the determination of step 350 in FIG. 3).

The invention is not limited to the embodiment described above, and various modified examples may be employed within the scope of the invention.

A first modified example will now be described. The angular velocity variation amount Δω defined by Equation (7) is calculated as a value obtained by subtracting the angular velocity ωk in the current cylinder from the angular velocity ωk-1 in the cylinder one before the current cylinder, but the angular velocity variation amount Δω is not limited thereto, and as shown in a following equation, may be calculated by subtracting the angular velocity ωk-1 in the cylinder one before the current cylinder from the angular velocity ωk in the current cylinder. In this case, an angular velocity variation amount Δω' is expressed by a following equation.

$$\Delta\omega' = \omega k - \omega k - 1 \tag{14}$$

In this case, a first angular velocity variation amount Δω1', a second angular velocity variation amount Δω2', and a rotation variation amount ΔNE' are expressed by a following equation.

$$\Delta NE' = \Delta\omega 1' - \Delta\omega 2' = (\omega n - \omega n - 1) - (\omega n - 6 - \omega n - 7) \tag{15}$$

This will now be described with reference to FIGS. 5A to 5C. In this case, as shown in FIGS. 5A to 5C, when a misfire occurs in an arbitrary cylinder (the third cylinder #3), the rotation variation amount $\Delta NE'$ (dN5) in the arbitrary cylinder takes a large negative value (i.e. the sign thereof is inverted relative to the rotation variation amount $\Delta NE$ of the embodiment described above). Accordingly, a determination threshold $\Delta NEth'$ takes a "negative" value, and when the rotation variation amount $\Delta NE'$ falls below the determination threshold $\Delta NEth'$, a misfire is determined to have occurred.

In this case, the "second condition" is applied to this modified example as follows. Since the predetermined threshold $\Delta NEth'$ takes a "negative" value, the "direction for exceeding the predetermined threshold $\Delta NEth'$" is a direction for reducing the value of the rotation variation amount $\Delta NE'$ in a negative direction. Hence, in this example, the second angular velocity variation amount $\Delta \omega 2'$ is capable of "reducing the value of the rotation variation amount $\Delta NE'$ in a negative direction" when the sign of the second angular velocity variation amount $\Delta \omega 2'$ is positive. In other words, the second condition is expressed by a following equation.

$$\Delta \omega 2 > 0 \quad (16)$$

In this case, therefore, the determination condition of step 350 on the flowchart shown in FIG. 3 is replaced by a following equation.

$$|\Delta \omega 1| < \Delta \omega 2 \quad (17)$$

Next, a second modified example will be described. In the embodiment described above, the value of the rotation variation amount $\Delta NE$ is replaced with "0" when the first angular velocity variation amount and the second angular velocity variation amount satisfy the predetermined condition of Equation (13). However, the replacement value may be a value other than "0" as long as the value does not exceed the determination threshold set at that time.

Next, a third modified example will be described. In the embodiment described above, when the predetermined condition ($|\omega 1| < -\Delta \omega 2$) is established, the misfire determination rotation variation amount $\Delta NEmd$ obtained by replacing the rotation variation amount $\Delta NE$ at that time with "0" is calculated, whereupon the misfire determination is executed by comparing the misfire determination rotation variation amount $\Delta NEmd$ with the predetermined threshold $\Delta NEth$. The invention is not limited thereto, however, and instead, when the predetermined condition is established, a misfire may be determined not to have occurred even in a case where the rotation variation amount $\Delta NE$ exceeds the predetermined threshold $\Delta NEth$. Specific operations performed in this case will be described below.

The CPU of the ECU 50 executes a "rotation variation amount acquisition routine" shown on a flowchart in FIG. 6 on an arbitrary cylinder of the internal combustion engine 10 when the CA of the arbitrary cylinder reaches compression top dead center TDC.

Hence, when the CA of one of the cylinders reaches compression top dead center TDC of the corresponding cylinder, the CPU starts processing from step 600 in FIG. 6, advances to step 610, executes processing of step 610 to 640 in sequence, as described below, and then advances to step 695, where the current routine is terminated.

In step 610, the CPU obtains the 30° CA time T30 (the time required for the CA of the arbitrary cylinder to rotate from TDC to 30° CA after TDC). In step 620, the CPU obtains the angular velocity $\omega n$ relating to the current cylinder in accordance with Equation (6). In step 630, the CPU obtains the angular velocity variation amount $\Delta \omega$ relating to the current cylinder in accordance with Equation (7). In step 640, the CPU obtains the rotation variation amount $\Delta NE$ relating to the current cylinder in accordance with Equation (10).

Note that the CPU stores the angular velocity $\omega n$, the angular velocity variation amount $\Delta \omega$, and the rotation variation amount $\Delta NE$ obtained respectively in steps 620 to 640 in the RAM in association with the cylinder number of the current cylinder.

Figure 7:
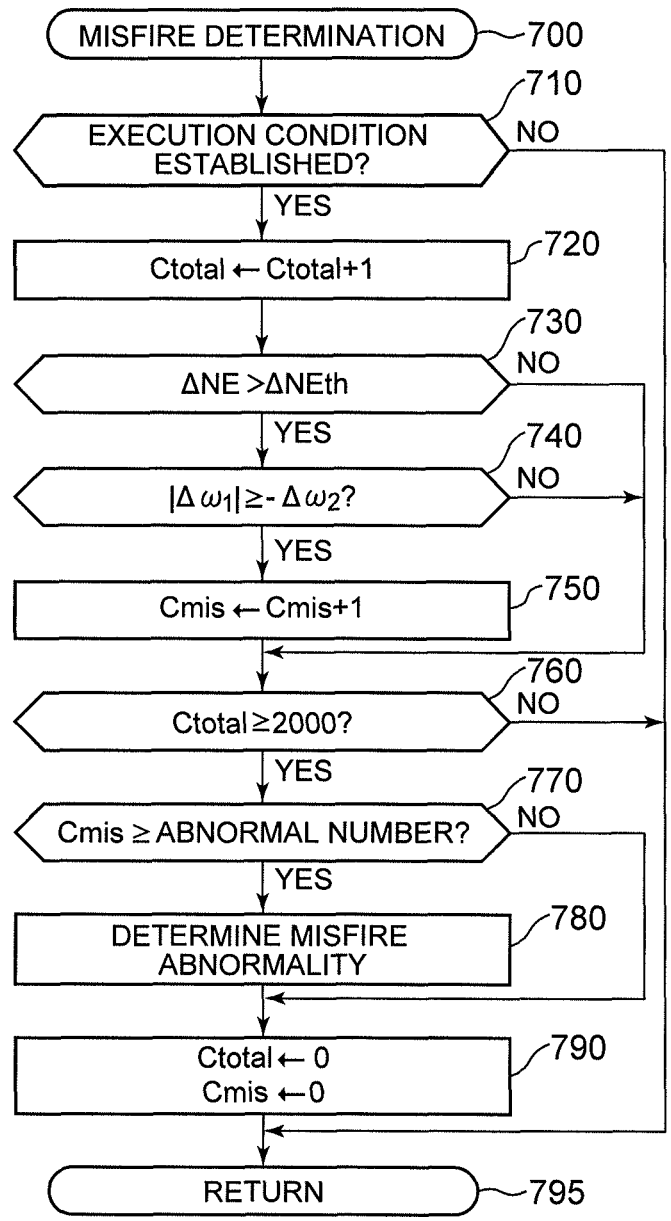
FIG. 7 is a flowchart showing a "misfire determination routine" according to the third modified example of this embodiment of the invention.

The CPU of the ECU 50 also executes a "misfire determination routine" shown on a flowchart in FIG. 7 on an arbitrary cylinder of the internal combustion engine 10 when the CA of the arbitrary cylinder reaches 60° CA after compression top dead center TDC.

Hence, when the CA of one of the cylinders reaches 60° CA after compression top dead center TDC of the corresponding cylinder, the CPU starts processing from step 700 of FIG. 7 and then advances to step 710. In step 710, the CPU determines whether or not an "execution condition" for determining whether a misfire has occurred is established.

When the execution condition is not established, the CPU obtains "No" in the determination of step 710 and advances directly to step 795, where the current routine is terminated. When the determination execution condition is established, on the other hand, the CPU executes processing described below. Several cases will be described below on the assumption that the execution condition remains established throughout.

First, a first case in which the rotation variation amount $\Delta NE$ does not exceed the predetermined threshold $\Delta NEth$ will be described. After obtaining "Yes" in the determination of step 710, the CPU advances to step 720 and counts the total determination number counter Ctotal up.

Next, the CPU advances to step 730 and determines whether or not the rotation variation amount $\Delta NE$ obtained in the "rotation variation amount acquisition routine" shown in FIG. 6 is larger than the predetermined threshold $\Delta NEth$. In accordance with the aforementioned assumption, the rotation variation amount $\Delta NE$ does not exceed the predetermined threshold $\Delta NEth$. Therefore, the CPU obtains "No" in the determination of step 730 and advances directly to step 760. In step 760, the CPU determines whether or not the total determination number counter Ctotal equals or exceeds "2000".

When, at this time, the value of the total determination number counter Ctotal is smaller than "2000", the CPU obtains "No" in the determination of step 760 and advances directly to step 795, where the current routine is terminated. When the routine is executed thereafter, the total determination number counter Ctotal is counted up in step 720 every time the execution condition of step 710 is established.

Next, a second case in which the rotation variation amount $\Delta NE$ exceeds the predetermined threshold $\Delta NEth$ such that the predetermined condition ($|\Delta \omega 1| < -\Delta \omega 2$) is established will be described. In this case, the CPU obtains "Yes" in the determination of step 730 after counting up the total determination number counter Ctotal in step 720, and then advances to step 740. In step 740, the CPU determines whether or not the predetermined condition shown in Equation (13) is established. In accordance with the assumption, the predetermined condition is established, and therefore the CPU obtains "Yes" in the determination of step 740 and advances to step 750. In step 750, the CPU counts the misfire number counter Cmis up. The misfire number counter Cmis is set at "0" in a separately executed initial routine. Accordingly, the value of the misfire number counter Cmis is increased by "1" from "0" every time "Yes" is obtained in the determination of step 740.

The CPU then advances to step 760. When the value of the total determination number counter Ctotal is smaller than "2000", the CPU obtains "No" in the determination of step 760 and advances directly to step 795, where the current routine is terminated. When the routine is executed thereafter, the total determination number counter Ctotal is counted up in step 720 every time the execution condition of step 710 is established.

In a third case, the rotation variation amount ΔNE exceeds the predetermined threshold ΔNEth but the predetermined condition (|Δω1|<−Δω2) is not established. In this case, the CPU obtains "Yes" in the determination of step 730 after counting up the total determination number counter Ctotal in step 720, and then advances to step 740. Since the predetermined condition is not established, the CPU obtains "No" in the determination of step 740. The CPU then advances directly to step 760. When the value of the total determination number counter Ctotal is smaller than "2000", the CPU obtains "No" in the determination of step 760 and advances directly to step 795, where the current routine is terminated. When the routine is executed thereafter, the total determination number counter Ctotal is counted up in step 720 every time the execution condition of step 710 is established.

When the processing (the "first case", the "second case", and the "third case") described above is executed repeatedly, the value of the total determination number counter Ctotal reaches "2000". In this case, when the CPU advances to step 760, the CPU obtains "Yes" in the determination of step 760 and then advances to step 770. In step 770, the CPU determines whether or not the value of the misfire number counter Cmis equals or exceeds the prescribed abnormal number ("30", for example).

When the value of the misfire number counter Cmis equals or exceeds the prescribed abnormal number, the CPU obtains "Yes" in the determination of step 770 and then advances to step 780. In step 780, the CPU determines that "a misfire abnormality (a misfire) has occurred". At this time, the CPU illuminates the warning lamp provided in the vehicle cabin, and writes information indicating that a misfire has occurred to the backup RAM. Next, the CPU advances to step 790 in order to set the respective values of the total determination number counter Ctotal and the misfire number counter Cmis at "0", and then advances to step 795, where the current routine is terminated.

When the value of the misfire number counter Cmis is smaller than the prescribed abnormal number, on the other hand, the CPU obtains "No" in the determination of step 770 and advances directly to step 790. The CPU then advances to step 795, where the current routine is terminated.

In another modified example of the embodiment, the determination apparatus may be applied to an internal combustion engine other than a six-cylinder engine (for example, a four-cylinder engine, a twelve-cylinder engine, and so on).

Furthermore, in this embodiment, the required rotation time is determined as the time T30 required for the crankshaft to rotate 30°, but the required rotation time may be determined as a time required for the crankshaft to rotate by "an angle other than 30°".

Moreover, in the case of a six-cylinder internal combustion engine, the required rotation time may be a time required for the crankshaft to rotate "from X° CA to Y° CA after compression top dead center (where X and Y are both between 0 and 120° CA". Further, in the case of a four-cylinder internal combustion engine, the required rotation time may be a time required for the crankshaft to rotate "from X° CA to Y° CA after compression top dead center (where X and Y are both between 0 and 180° CA". In other words, the required rotation time may be set at any value which correlates with the CA velocity during the expansion stroke of an arbitrary cylinder and from which it is possible to tell the difference between a case in which normal combustion is underway in the arbitrary cylinder and a case in which a misfire has occurred in the arbitrary cylinder.

The predetermined threshold ΔNEth may take a fixed value or a value that varies on the basis of at least one of the engine rotation velocity NE and an engine load (for example, the intake air pressure Pm, the accelerator pedal depression amount Accp, the intake air amount Ga, and so on).

The value of the total determination number counter Ctotal is not limited to "2000", and may be a value "other than 2000".

The total number of determinations does not have to be counted. In other words, step 420 or step 720 and step 450 or step 760 may be omitted from the misfire determination routine in FIG. 4 or FIG. 7.

What is claimed is:

1. A misfire determination for a multi-cylinder internal combustion engine, the misfire determination apparatus comprising: a crank position sensor that detects a rotation position of a crankshaft; and a processor programmed to: obtain, using an output from the crank position sensor, a crank angle velocity on the basis of a time required for the crankshaft to rotate through a predetermined rotation angle width from a first crank angle to a second crank angle during an expansion stroke of each cylinder of the multi-cylinder internal combustion engine; obtain an angular velocity variation amount, which is a difference in the crank angle velocity between two cylinders that reach the expansion stroke consecutively; obtain a rotation variation mount which is a difference between a first angular velocity variation amount and a second angular velocity variation amount, the first angular velocity variation amount being obtained during the expansion stroke of an arbitrary cylinder among respective cylinders, and the second angular velocity variation amount being obtained in relation to a cylinder that has reached the expansion stroke in a Nth revolution of the crankshaft before the arbitrary cylinder reaches the expansion stroke, the N being a positive integer; when the rotation variation amount exceeds a predetermined threshold: determine that a misfire has not occurred in the multi-cylinder internal combustion engine when a predetermined condition is established, the predetermined condition being established when (i) a magnitude of the second angular velocity variation amount is greater than a magnitude of the first angular velocity variation amount, and (ii) the second angular velocity variation amount has a sign by which a value of the rotation variation amount relating to the arbitrary cylinder is oriented in a direction in which the rotation variation amount exceeds the predetermined threshold; and determine that a misfire has occurred in the multi-cylinder internal combustion engine when the predetermined condition is not established, such that the misfire determination apparatus does not erroneously determine a misfire due to an effect of a temporary increase in an engine rotation velocity.

2. The misfire determination apparatus for the multi-cylinder internal combustion engine according to claim 1, wherein the processor is programmed to: repeat a misfire determination after replacing the rotation variation amount relating to the arbitrary cylinder with a value that does not exceed the predetermined threshold when the predetermined condition is established.

3. The misfire determination apparatus for the multi-cylinder internal combustion engine according to claim 1, wherein the processor is programmed to: repeat a misfire determination after replacing the rotation variation amount relating to the arbitrary cylinder with 0 when the predetermined condition is established.

* * * * *